Patented Mar. 7, 1950

2,500,054

UNITED STATES PATENT OFFICE 2,500,054

LIQUID UREA FORMALDEHYDE ADHESIVE COMPOSITIONS

Leonard Ralph Anthony, Hildenborough, near Tonbridge, Benjamin Frenkel, Southborough, Clarence Ewart Smith, Tonbridge, and Reginald William Henry Wicking, London, England, assignors to British Resin Products, Limited, London, England, a British company No Drawing. Application March 12, 1946, Serial No. 653,954. In Great Britain March 15, 1945

19 Claims. (Cl. 260—45.1)

This invention is for improvements in or relating to liquid resinous compositions containing urea-formaldehyde condensation products suitable for use as adhesives.

The use of urea-formaldehyde type resinous condensation products as adhesives is well known. They have the property of hardening rapidly on the addition of a suitable accelerator either in the cold or at elevated temperatures, for example 100° C. A bond of great strength is formed which is, however, greatly affected by water, as illustrated by the following experiment:

A piece of plywood is prepared by glueing at 100° C. and 150 lbs./sq. in. three plies of wood with a normal urea-formaldehyde adhesive, consisting, for example of a viscous urea-formaldehyde resin and a suitable hardener such as ammonium chloride. Such plywood possesses a high shear strength and in many instances the wood breaks down under stress prior to the resin bond. On immersion in cold water the plywood bond retains most of its strength, but on immersion into boiling water the adhesive bond is attacked and so weakened that the wood plies can be taken apart quite readily.

It has already been proposed in the production of urea-formaldehyde resins for moulding purposes or for use as lacquers, after dissolving in suitable organic solvents, to improve the water-resistance of the finally-hardened resin by adding phenol and the like compounds to the urea-formaldehyde mixture at various stages of the reaction.

Among the objects of the present invention is the preparation of liquid resins which can be used as adhesives or binding agents and which after hardening form joints with greatly improved resistance to water compared with urea-formaldehyde adhesives already known.

A further object is the preparation of adhesives which after application in thin or thick layers and hardening, remain free from cracking or crazing so that they are suitable for use as gap-filling cements.

According to the present invention, there is provided a process for the production of a liquid synthetic resin adhesive composition which comprises the step of reacting 1½ to 3 mols of formaldehyde in aqueous solution with 1 mol of a urea compound until at least 1 mol of the formaldehyde compound has reacted with 1 mol of said urea compound, the step of continuing the reaction at a pH of 4.0 to 6.5 and at a temperature of at least 60° C. to a stage at which the reaction mixture is a clear syrupy liquid which remains clear on cooling, the step of adjusting the pH of the reaction mixture to 7.0 to 7.5, the step of removing any excess water contained in the reaction mixture by evaporation and including the step of adding to the reaction mixture at any stage of the process after the conclusion of the first said step a phenolic compound and heating the mixture thus produced.

It is preferred that each mol of the urea compound should be combined with from 1.3 to 2.5 mols of formaldehyde and that each mol of the phenolic compound should be combined with from 0.5 to 3 mols of formaldehyde.

By the expression "urea compound" as used in the specification and claims we mean, urea and thiourea.

By the expression "phenolic material" as used in the specification and claims, we mean phenol and its homologues, resorcinol and mixtures thereof capable of reaction with formaldehyde to form resinous condensation products as well as the reactive fusible or liquid resinous condensation products of said substances with formaldehyde. If the phenolic material used does not contain resorcinol, the quantity used should be between 10–100% of the weight of urea compound used. If resorcinol is used, however, smaller quantities will be sufficient and we have found the practical limits to be between 1–40% of the weight of urea compound.

The formaldehyde will usually be incorporated in the form of its usual 40% solution in water. Alternatively, or in addition, its polymers or hexamethylenetetramine may be used.

The initial reaction between the 1½–3 mols of formaldehyde and the 1 mol of the urea compound may take place under either acid or alkaline conditions. If the mixture of urea and formaldehyde is initially alkaline it may be found that as the reaction proceeds the solution becomes less alkaline and may become acid. The pH value must, however, be adjusted to between 4.0–6.5, unless it has already altered to such a value, before heating at a temperature of 60° C. or above to cause resinification, as shown by the formation of a clear syrupy liquid which remains clear on cooling. This resinification step may take place either before or after the addition of the phenolic material to the urea-formaldehyde initial condensation product.

In order to obtain good results with urea-formaldehyde adhesives it is desirable to advance the resinification reaction as far as possible, that is, to increase the average size of the resin molecules as evidenced by the rise in viscosity of the resin. Practical considerations usually make it impossible, however, to advance the resinification to a technically desirable extent.

We have found that the addition of phenolic material to the urea-formaldehyde reaction products allows the resinification reaction to be carried further than has been possible in its absence, so it is preferred to add the phenolic material to the urea-formaldehyde initial condensation product before resinification is carried out.

Dehydration of the resulting syrupy liquid resin will be necessary. This may be done either at the end of the process or immediately after the resinification step if that is carried out before the addition of the phenolic material. In either case, before dehydration, the pH value of the liquid must be adjusted to between 7.0 and 7.5. Dehydration may conveniently be effected by distillation under reduced pressure.

Some of the steps of the process may take place concurrently, for example the initial reaction between the urea and formaldehyde to form methylol ureas and the resinification of the said initial reaction products in accordance with the usual practice. Also, if the phenolic material consists of a phenol-formaldehyde condensation product dehydration may be effected while reacting it with the urea-formaldehyde condensation product.

The adhesives prepared according to the present invention may be used in the manner well known in the art using suitable accelerators such as acids or acidic substances, hardening agents, such as phosphoric acid, zinc chloride or ammonium chloride or by the addition of substances which yield such accelerators or hardening agents on heating, for example melamine hydrochloride. The accelerators and hardening agents are termed in the claims "setting agents" and they are added after the adhesives of the invention, including those of the examples below, are prepared.

The following examples illustrate the manner in which the invention may be carried into effect, the quantities referred to being given in parts by weight:

*Example 1.*—To 640 parts Formalin (40%), previously adjusted with caustic soda solution to a pH of 9.5, are added 240 parts of urea. The temperature of the mass is raised to 40° C. and held at that temperature until the unreacted formaldehyde amounts to 5–6% of the total mass. The pH of the mass is then adjusted with normal sulphuric acid solution to a value of 5.3. The mass is brought to the boil and refluxed for 15 minutes. At the end of this period its pH is raised to a value of 7.0 to 7.5 by the addition of caustic soda solution, and the resin is dehydrated under a pressure of 60 mm. mercury to a weight of 484 parts. This resin has the following characteristics:

Viscosity at 25° C__ 100 poises
Free formaldehyde. 10.8% calculated on the resin
pH _____ 8.0

To 120 parts of the above resin are added 27 parts of commercial cresol cut (containing 52% m-cresol). The mass is raised to 60° C. and reacted at that temperature for 30 minutes. At the end of this period the pH of the resin is adjusted with normal caustic soda solution to 7.5.

The viscosity of the final resins prepared as described in the foregoing example varied, in a number of experiments, from 130 to 150 poises and they all had a content of free formaldehyde of about 0.5% calculated on the resin. The water-resistance of the cured final resins was, in all cases, superior to that of resins prepared without the use of the commercial cresol cut.

*Example 2.*—To 640 parts Formalin (40%), previously adjusted with caustic soda solution to a pH of 9.5, are added 240 parts of urea. The temperature of the mass is raised to 40° C. and held at that temperature for 30 minutes. 90 parts of commercial xylenol cut, having a boiling point range of between 210° and 219° C., are introduced, and the mass is maintained at 40° C. for a further 15 minutes. It is then acidified with normal sulphuric acid to a pH of 5.3, brought to the boil and refluxed for 15 minutes. At the end of this period, the pH of the mixture is raised to 7.0 to 7.5 by the addition of caustic soda solution and the resin dehydrated to a weight of 557 parts. The resin has the following characteristics:

Viscosity at 25° C_____poises__ 400
pH _____ 7.5

The water-resistance of the resin produced as above described and cured is markedly superior to that of a cured resin produced in the same way except that the addition of the commercial xylenol cut was omitted.

*Example 3.*—*Resin A*—To 640 parts Formalin (40%) are added 35 parts of ammonia (specific weight .880) followed by 240 parts of urea. pH of the mass is then 8.0. The mass is brought to the boil and refluxed for 30 minutes, by which time its pH has dropped to 5.5. It is cooled to 60° C. and resin B is added.

*Resin B*—To 270 parts Formalin (40%) are added 130 parts commercial cresol cut (containing 50% m-cresol) and 0.7 part of caustic soda dissolved in 5 parts water. The mass is raised to the boil and refluxed for 15 minutes. It is cooled to 60° C. and added to resin A, its pH being 7.7

Resins A and B are mixed at 60° C. and dehydrated under a pressure of 60 mm. mercury to weight of 700 parts of resin. The resin has the following characteristics:

Viscosity at 25° C____ 450 poises
Free formaldehyde__ 1.8% calculated on the resin
pH _____ 7.0

The resin produced in accordance with this example, when cured, had a better water resistance than that produced in the same way but omitting the addition of resin B.

The resins prepared in accordance with the above examples and in accordance with the invention herein described may be used as adhesives or binding agents and after hardening or setting form joints with greatly improved resistance to water compared with urea formaldehyde adhesives already known.

In addition to improved water-resistance, products prepared according to our invention possess a number of improved characteristics such as increased viscosity, greater tackiness and faster drying power as compared with the ordinary urea-formaldehyde type resinous condensation products. It will be noted that all these properties are connected with their molecular size.

What we claim is:

1. A process for the production of a liquid synthetic resin adhesive composition which comprises the step of reacting 1½ to 3 mols of a formaldehyde compound of the class consisting of formaldehyde, its polymers and hexamethylenetetramine in aqueous solution with 1 mol of a urea compound of the class consisting of urea and thiourea until at least 1 mol of the formaldehyde compound has reacted with 1 mol of said urea compound, the step of continuing the reaction at a pH of 4.0 to 6.5 and at a temperature of at least 60° C., to a stage at which the reacton mixture is a clear syrupy liquid which remains clear on cooling, the step of adjusting the pH of the reaction mixture to 7.0 to 7.5, the step of removing any excess water contained in the reaction mixture by evaporation and including the additional step of adding to the reaction mixture, at any stage of the process after the conclusion of the first said step, a phenolic compound of the class consisting of phenol, resorcinol, phenol homologues capable of reaction with formaldehyde to produce resinous condensation products, mixtures of these substances and the reactive resinous condensation products of these substances with formaldehyde, and heating the mixture thus produced to a temperature of at least 60° C., all of said steps being carried out prior to the addition of any setting agent.

2. A process according to claim 1 wherein a monohydric phenolic compound is added in an amount of from 10% to 100% by weight of said urea compound.

3. A process according to claim 1 wherein said phenolic compound is resorcinol and is added in an amount of from 1% to 40% by weight of said urea compound.

4. A process for the production of a liquid synthetic resin adhesive composition which comprises the step of reacting 1½ to 3 mols of a formaldehyde compound of the class consisting of formaldehyde, its polymers and hexamethylenetetramine in aqueous solution with 1 mol of urea until at least 1 mol of the formaldehyde compound has reacted with 1 mol of urea, the step of continuing the reaction at a pH of 4.0 to 6.5 and at a temperature of at least 60° C. to a stage at which the reaction mixture is a clear syrupy liquid which remains clear on cooling, the step of adjusting the pH of the reaction mixture to 7.0 to 7.5, the step of removing any excess water contained in the reaction mixture by evaporation and including the additional step of adding to the reaction mixture, at any stage of the process, after the conclusion of the first said step, from 10% to 100% by weight, based on the urea, of a monohydric alkyl-substituted phenol capable of reaction with formaldehyde to produce resinous condensation products and heating the mixture thus produced to a temperature in the range of at least 60° C. to the boiling point of the mixture, all of said steps being carried out prior to the addition of any setting agent.

5. A process for the production of a liquid synthetic resin adhesive composition which comprises the step of reacting 1½ to 3 mols of a formaldehyde compound of the class consisting of formaldehyde, its polymers and hexamethylenetetramine at an alkaline pH in aqueous solution with 1 mol of urea until at least 1 mol of the formaldehyde compound has reacted with 1 mol of urea, the step of continuing the reaction at a pH of 4.0 to 6.5 and at a temperature of at least 60° C. to a stage at which the reaction mixture is a clear syrupy liquid which remains clear on cooling, the step of adjusting the pH of the reaction mixture to 7.0 to 7.5, the step of removing any excess water contained in the reaction mixture by evaporation and including the additional step of adding to the reaction mixture, at any stage of the process, after the conclusion of the first said step, from 10% to 100% by weight, based on the urea, of a monohydric alkyl-substituted phenol capable of reaction with formaldehyde to produce resinous condensation products and heating the mixture thus produced to a temperature range from at least 60° C. to the boiling point of the mixture, all of said steps being carried out prior to the addition of any setting agent.

6. A process for the production of a liquid synthetic resin adhesive composition which comprises the step of reacting 1½ to 3 mols of a formaldehyde compound of the class consisting of formaldehyde, its polymers and hexamethylenetetramine in aqueous solution with 1 mol of a urea compound of the class consisting of urea and thiourea until at least 1 mol of the formaldehyde compound has reacted with 1 mol of said urea compound, the step of adding a phenolic compound of the class consisting of phenol, resorcinol, phenol homologues capable of reaction with formaldehyde to produce resinous condensation products, mixtures of these substances and the reactive resinous condensation products of these substances with formaldehyde, the step of continuing the reaction at a pH of 4.0 to 6.5 and at a temperature of at least 60° C. to a stage at which the reaction mixture is a clear syrupy liquid which remains clear on cooling, the step of adjusting the pH of the reaction mixture to 7.0 to 7.5 and the step of removing any excess water contained in the reaction mixture by evaporation all of said steps being carried out prior to the addition of any setting agent.

7. A process according to claim 1 wherein each mol of said urea compound is combined with from 1.3 to 2.5 mols of formaldehyde.

8. A process according to claim 1 wherein each mol of said phenolic compound is combined with from 0.5 to 3 mols of formaldehyde.

9. A process for the production of a liquid synthetic resin adhesive composition which comprises reacting 1½ to 3 mols of formaldehyde with 1 mol of urea in aqueous solution at a temperature of about 40° C. at an alkaline pH until at least 1 mol of formaldehyde has reacted with 1 mol of urea, adding from 10% to 100% by weight, based on the urea, of an alkyl-substituted phenol capable of reaction with formaldehyde to produce resinous condensation products and continuing the reaction for a further short period of time, adjusting the pH of the mixture to between 4.0 and 6.5, refluxing until a clear syrupy liquid is obtained which will remain clear on cooling, adjusting the pH of the syrupy liquid to between 7.0 and 7.5 and partially dehydrating said syrupy liquid to a viscous resin all of said steps being carried out prior to the addition of any setting agent.

10. A process for the production of a liquid synthetic resin adhesive composition which comprises refluxing 1½ to 3 mols of hexamethylenetetramine with 1 mol of urea in aqueous solution until the pH falls to about 5.5, cooling the reaction mixture to 60° C., adding thereto a cresol-formaldehyde resin produced by refluxing cresol and formaldehyde in aqueous solution in the presence of an alkali for about 15 minutes and then cooling to 60° C., and having a cresol content of from 10% to 100% by weight of said urea, and thereafter partially dehydrating and interacting the mixed resins by heating under vacuum to produce a viscous resin all of said steps being carried out prior to the addition of any setting agent.

11. A process for the production of a liquid synthetic resin adhesive composition which comprises reacting 1½ to 3 mols of formaldehyde with 1 mol of urea in aqueous solution at a temperature of about 40° C. at an alkaline pH until at least 1 mol of formaldehyde has reacted with 1 mol of urea, adjusting the pH of the mixture to between 4.0 and 6.5, refluxing until a clear syrupy liquid is obtained which will remain clear on cooling, adjusting the pH of the syrupy liquid to between 7.0 and 7.5, partially dehydrating said syrupy liquid to a viscous resin and thereafter heating said resin with from 10% to 100% by weight, based on said urea, commercial cresol at a temperature in a range of about 60° C. to the boiling point of the mixture all of said steps being carried out prior to the addition of any setting agent.

12. A process for the production of a liquid synthetic resin adhesive composition which comprises reacting 1½ to 3 mols of formaldehyde with 1 mol of urea in aqueous solution at a temperature of about 40° C. at an alkaline pH until at least 1 mol of formaldehyde has reacted with 1 mol of urea, adding from 10% to 100% by weight, based on said urea, commercial xylenol and continuing the reaction for a further short period of time, adjusting the pH of the mixture to between 4.0 and 6.5, refluxing until a clear syrupy liquid is obtained which will remain clear on cooling, adjusting the pH of the syrupy liquid to between 7.0 and 7.5 and partially dehydrating said syrupy liquid to a viscous resin all of said steps being carried out prior to the addition of any setting agent.

13. A process for the production of a liquid synthetic resin adhesive composition which comprises reacting 1½ to 3 mols of formaldehyde with 1 mol of urea in aqueous solution at a temperature of about 40° C. at a pH of about 9.5 until at least 1 mol of formaldehyde has reacted with 1 mol of urea, adjusting the pH of the mixture to about 5.3, refluxing until a clear syrupy liquid is obtained which will remain clear on cooling, adjusting the pH of the syrupy liquid to between 7.0 and 7.5, partially dehydrating said syrupy liquid to a viscous resin and thereafter heating said resin with from 10% to 100% by weight, based on said urea, commercial cresol at a temperature of at least 60° C. all of said steps being carried out prior to the addition of any setting agent.

14. A process for the production of a liquid synthetic resin adhesive composition which comprises reacting 1½ to 3 mols of formaldehyde with 1 mol of urea in aqueous solution at a temperature of about 40° C. and at a pH of about 9.5 until at least 1 mol of formaldehyde has reacted with 1 mol of urea, adding from 10% to 100% by weight, based on said urea, commercial xylenol and continuing the reaction for a further short period of time, adjusting the pH of the mixture to about 5.3, refluxing until a clear syrupy liquid is obtained which will remain clear on cooling, adjusting the pH of the syrupy liquid to between 7.0 and 7.5 and partially dehydrating said syrupy liquid to a viscous resin all of said steps being carried out prior to the addition of any setting agents.

15. A process for the production of a liquid synthetic resin adhesive composition which comprises the step of reacting 1½ to 3 mols of a formaldehyde compound of the class consisting of formaldehyde, its polymers and hexamethylenetetramine in aqueous solution with 1 mol of urea until at least 1 mol of the formaldehyde compound has reacted with 1 mol of urea, the step of continuing the reaction at a pH of 4.0 to 6.5 and at a temperature of at least 60° C., to a stage at which the reaction mixture is a clear syrupy liquid which remains clear on cooling, the step of adjusting the pH of the reaction mixture to 7.0 to 7.5, the step of removing any excess water contained in the reaction mixture by evaporation and including the additional step of adding to the reaction mixture, at any stage of the process after the conclusion of the first said step, a phenolic compound of the class consisting of phenol, resorcinol, phenol homologues capable of reaction with formaldehyde to produce resinous condensation products, mixtures of these substances and the reactive resinous condensation products of these substances with formaldehyde, and heating the mixture thus produced to a temperature of at least 60° C., all of said steps being carried out prior to the addition of any setting agent.

16. A process for the production of a liquid synthetic resin adhesive composition which comprises the step of reacting 1½ to 3 mols of a formaldehyde compound of the class consisting of formaldehyde, its polymers and hexamethylenetetramine at an alkaline pH in aqueous solution with 1 mol of a urea compound of the class consisting of urea and thiourea until at least 1 mol of the formaldehyde compound has reacted with 1 mol of said urea compound, the step of continuing the reaction at a pH of 4.0 to 6.5 and at a temperature of at least 60° C. to a stage at which the reaction mixture is a clear syrupy liquid which remains clear on cooling, the step of adjusting the pH of the reaction mixture to 7.0 to 7.5, the step of removing any excess water contained in the reaction mixture by evaporation and including the additional step of adding to the reaction mixture, at any stage of the process after the conclusion of the first said step, a phenolic compound of the class consisting of phenol, resorcinol, phenol homologues capable of a reaction with formaldehyde to produce resinous condensation products, mixtures of these substances and the reactive resinous condensation products of these substances with formaldehyde, and heating the mixture thus produced to a temperature of at least 60° C., all of said steps being carried out prior to the addition of any setting agent.

17. A process for the production of a liquid synthetic resin adhesive composition which comprises the step of reacting 1½ to 3 mols of a formaldehyde compound of the class consisting of formaldehyde, its polymers and hexamethylenetetramine at an alkaline pH in aqueous solution with 1 mol of urea until at least 1 mol of the formaldehyde compound has reacted with 1 mol of urea, the step of continuing the reaction at a pH of 4.0 to 6.5 and at a temperature of at least 60° C., to a stage at which the reaction mixture is a clear syrupy liquid which remains clear on cooling, the step of adjusting the pH of the reaction mixture to 7.0 to 7.5, the step of removing any excess water contained in the reaction mixture by evaporation and including the additional step of adding to the reaction mixture, at any stage of the process after the conclusion of the first said step, a phenolic compound of the class consisting of phenol, resorcinol, phenol homologues capable of reaction with formaldehyde to produce resinous condensation products, mixtures of these substances and the reactive resinous condensation products of these substances with formaldehyde, and heating the mixture thus produced to a temperature of at least 60° C., all of said steps being carried out prior to the addition of any setting agent.

18. A process for the production of a liquid synthetic resin adhesive composition which comprises reacting 1½ to 3 mols of formaldehyde with 1 mol of urea in aqueous solution at a temperature of about 40° C. at an alkaline pH until at least 1 mol of formaldehyde has reacted with 1 mol of urea, adjusting the pH of the mixture to between 4.0 and 6.5, refluxing until a clear syrupy liquid is obtained which will remain clear on cooling, adjusting the pH of the syrupy liquid to between 7.0 and 7.5, partially dehydrating said syrupy liquid to a viscous resin and thereafter heating said resin at a temperature of at least 60° C. with from 10% to 100% by weight, based on the urea, of an alkyl-substituted phenol capable of reaction with formaldehyde to produce resinous condensation products, all of the steps being carried out prior to the addition of any setting agent.

19. A process for the production of a liquid synthetic resin adhesive composition which comprises the step of reacting 1½ to 3 mols of a formaldehyde compound of the class consisting of formaldehyde, its polymers and hexamethylenetetramine in aqueous solution with 1 mol of urea until at least 1 mol of the formaldehyde compound has reacted with 1 mol of urea, the step of continuing the reaction at a pH of 4.0 to 6.5 and at a temperature of at least 60° C. to a stage at which the reaction mixture is a clear syrupy liquid which remains clear on cooling, the step of adjusting the pH of the reaction mixture to 7.0 to 7.5, the step of removing any excess water contained in the reaction mixture by evaporation and including the additional step of adding phenol to the reaction mixture, in an amount of from 10% to 100% by weight, based on the weight of urea at any stage of the process after the conclusion of the first said step, and heating the mixture thus produced to a temperature of at least 60° C., all of said steps being carried out prior to the addition of any setting agent.

LEONARD RALPH ANTHONY.
BENJAMIN FRENKEL.
CLARENCE EWART SMITH.
REGINALD WILLIAM HENRY WICKING.

REFERENCES CITED

The following references are of record in the file of this patent:

UNITED STATES PATENTS

| Number | Name | Date |
|---|---|---|
| 2,190,239 | Menger | Feb. 13, 1940 |
| 2,306,057 | Hayward | Dec. 22, 1942 |
| 2,380,239 | Howald | July 10, 1945 |